TELEVISION RECEIVER WITH SOUND RECURRING AS PULSES DURING BLANKING PERIODS
Filed Dec. 26, 1946
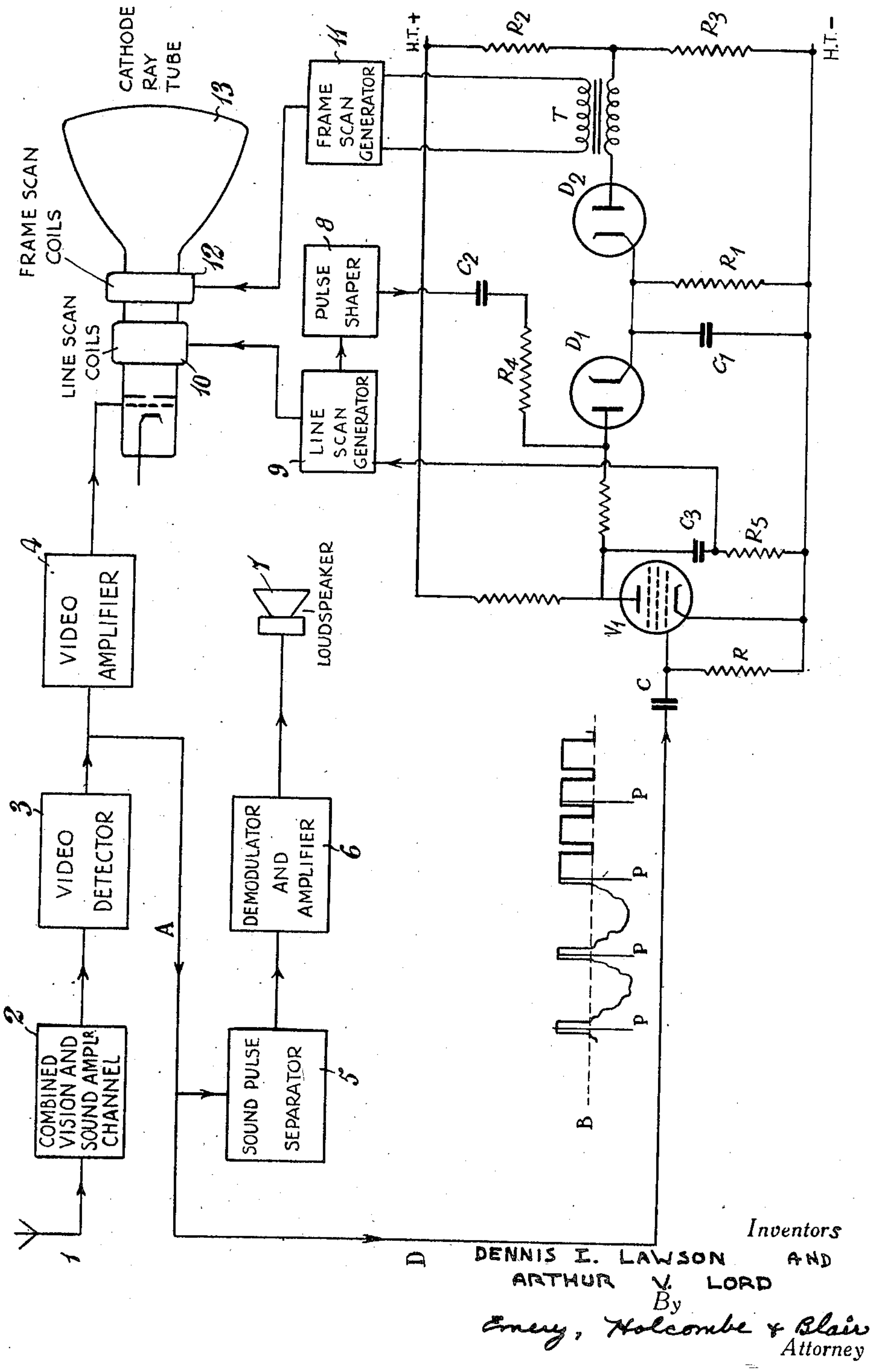
Inventors
DENNIS I. LAWSON AND
ARTHUR V. LORD
By
Emery, Holcombe & Blair
Attorney Patented Mar. 11, 1952

2,589,100

UNITED STATES PATENT OFFICE 2,589,100

TELEVISION RECEIVER WITH SOUND RECURRING AS PULSES DURING BLANKING PERIODS

Dennis I. Lawson and Arthur V. Lord, Cambridge, England, assignors to Pye Limited, Cambridge, England, a British company Application December 26, 1946, Serial No. 718,560
In Great Britain January 8, 1946

4 Claims. (Cl. 178—5.8)

The present invention relates to television receivers and more particularly to the frame synchronisation of such receivers, and is especially applicable to receivers for use in the reception of television waveforms incorporating sound or other pulses during the interline blanking period, as described, for example in the specification of our copending application Serial No. 703,084, although the invention is applicable to television receivers in general.

These sound or other pulses (hereinafter referred to as sound pulses) which are positioned in the line blanking periods of the waveform and may be modulated in amplitude, width, phase, or frequency, introduce difficulties in frame synchronisation in the receiver due to the sound pulses also occurring during the framing periods. Similar difficulties in frame synchronisation also occur in television receivers for the reception of ordinary television waveforms without sound or like pulses incorporated therein by reason of disturbances which sometimes occur regularly or intermittently at the line frequency.

The purpose of the framing period, during which according to the British television system the waveform falls to zero level, is to allow a condenser in the frame synchronizing circuit either to charge or discharge to a predetermined level at which the frame time base is triggered. In cases in which sound pulses or other disturbing pulses occurring at the line frequency appear in the waveform, the point at which charging or discharging commences will be determined by the position of the trailing edge of the pulse, and if this edge varies, for example in the case of sound pulses which are modulated in time, the instant at which synchronization occurs will depend upon the position of the trailing edge of the pulse, that is for example upon the modulation content in the case of a sound pulse.

In the case of interlaced scanning the situation is slightly different, for in this case there will not be sound pulses at the end of odd frames, since the frame synchronisation period occurs after half the last line of the frame has been scanned. Thus, while in the case of odd frames the charging or discharging of the frames synchronising condenser commences at the beginning of the framing period, on even frames the charging or discharging of the frame synchronising condenser does not begin until the end of the sound pulse so that, even in the absence of modulation, consecutive frames are displaced from the correct position and a condition known to those skilled in the art as "pairing" results.

When modulation is present, the pairing will vary in accordance with the modulation.

It will be appreciated that a similar condition of pairing could be produced by other disturbing pulses which occur regularly or intermittently at the line frequency.

The present invention has for its object to overcome the above drawbacks and to this end consists in applying pulses to the frame synchronising separator, or to some other preceding point in the frame synchronising channel of the receiver, at such instants and for such durations that the effect of the sound pulses or other disturbing pulses occurring at line frequency is counteracted during the framing periods. These applied pulses are preferably derived from the line oscillator and applied to the synchronising separator valve. The pulses, which must have a duration and positioning in time sufficient to cover the variations on the sound pulses or other disturbing pulses, may conveniently be derived either from the cathode of the line oscillator or from the primary or secondary winding of the line scanning transformer.

In order that the invention may be more clearly understood, an embodiment thereof will now be described with reference to the accompanying drawing, which shows a block circuit diagram of a television receiver for the reception of a television waveform incorporating sound pulses in the interline blanking period, and includes a synchronising separator stage of the kind described in the specification of copending application Serial No. 683,700, now Patent No. 2,500,839, granted March 14, 1950, applied to the separation of the frame synchronising pulses from the combined sound and television waveform in which the sound appears as pulses of opposite sign to the synchronising pulses during the line blanking periods. The diagram shows the television waveform in accordance with the British television standards with the sound pulses positioned in the line blanking periods as described in our copending application Serial No. 703,084.

The incoming television waveform received on the aerial 1 is fed through the combined vision and sound amplifier channel 2, to the video detector 3, the output from which is fed through the video amplifier 4 to the grid of the cathode ray tube 13 to provide the video modulation of the tube. The output from the video detector 3 is also applied through the lead A to the sound pulse separator circuit 5 wherein the sound pulses are separated from the video waveform. The output from the sound pulse separator is fed through the demodulator and amplifier 6, which demodulates and amplifies the sound signals, which are fed to the loud speaker 7. This sound channel may be constructed as described with reference to Fig. 11 of our copending application Serial No. 703,084. The output from the video detector 3 is further applied through the lead D to the grid of the valve $V_1$ via the condenser C and with the synchronising pulses having a positive sign. The time constant of the condenser resistance network CR is arranged to be long compared with the picture line period so that the black level B of the waveform becomes equal to the point at which valve conduction takes place, and the picture part of the waveform is therefore forced into the "cut off" region of the grid-anode characteristic of the valve. The valve $V_1$ is thus only conductive during portions of the inverted waveform which are more positive than the black level B that is during the line and frame synchronising pulse periods. Every time the waveform reaches the level B the valve will conduct and the anode potential will fall. The consequent reduction of the anode potential of the diode $D_1$ will stop the diode conducting and the condenser $C_1$ will discharge through the resistance $R_1$. The line synchronising pulses may therefore be derived from the anode of $V_1$ through the differentiating circuit $C_3$ and $R_5$ applied to trigger the line scan generator 9, the output of which is applied to the line deflecting coils 10, arranged on the neck of the cathode ray tube 13. At other times when the valve $V_1$ is non-conducting the anode $V_1$ will reach the H. T. voltage, diode $D_1$ will be rendered conducting and the condenser $C_1$ will be charged through the diode $D_1$. During the framing pulse, diode $D_1$ will be non-conducting for a long period and the potential of $C_1$ will fall enough during this period for diode $D_2$ to conduct by virtue of its low cathode potential, provided that its anode potential is correctly adjusted by the potentiometer $R_2$, $R_3$. The instant the diode $D_2$ conducts a pulse will be sent through the transformer T to trigger the frame scan generator 11, the output of which is applied to the frame deflecting coils 12 also arranged on the neck of the cathode ray tube 13. It will be appreciated that the leading edge of each sound pulse P will stop $V_1$ conducting, that $C_1$ will charge over the duration of a sound pulse, and that $V_1$ will only conduct again at the end of a sound pulse. In order to overcome this, negative pulses derived from the line scan generator 9 and fed through the pulse shaping circuit 8 are applied through condenser $C_2$ and resistance $R_4$ to the anode of diode $D_1$ at such instants and of such duration as to cover the periods of the sound pulses. These pulses reduce the anode potential to maintain the diode $D_1$ non-conducting even though the anode potential of $V_1$ rises at these times due to the sound pulses. In this way the effect of the sound pulses on the frame synchronisation may be eliminated. The pulse shaping circuit 8 may be of the type shown in U. S. Patent No. 2,459,723 to Schantz.

Although a particular embodiment has been described, it will be understood that this is given merely by way of example and that various modifications may be devised without departing from the scope of the invention. For example, the object of this invention may be attained by applying positive pulses via the condenser $C_1$ to the cathode circuit of the diode $D_1$ or to the grid of $V_1$ instead of negative pulses to the anode of $D_1$.

Further, although the invention has been particularly described with reference to a combined sound and television system, it will be understood that the circuit arrangement described could be used for eliminating distrubances which may occur regularly or intermittently at the line frequency in television waveforms which do not incorporate sound pulses, provided that such disturbances occur within the range of control of the pulses applied to the frame synchronising separator.

We claim:

1. In a television receiver, a frame time base, a channel in the receiver through which the frame synchronising pulses are fed to the frame time base, and means for counteracting disturbing impulses which occur in the received waveform at intervals of the line frequency during and of opposite sign to the framing pulses, said means comprising means for generating a series of auxiliary pulses at the line repetition frequency and of shorter duration than the frame synchronising pulses, and means for applying said series of auxiliary pulses to the frame synchronising channel, and means for mixing said auxiliary pulses with the frame synchronising pulses with the same sign as the frame synchronising pulses and at instants which occur within the frame synchronising pulses.

2. In a television receiver, a frame time base, a frame synchronising separator for separating the frame synchronising pulses from the received synchronising waveform, means for triggering the frame time base by the separated frame synchronising pulses, means for producing a series of auxiliary pulses of line repetition frequency and of shorter duration than the received frame synchronising pulses, means for applying the received synchronising waveform to the frame synchronising separator, and means for mixing said series of auxiliary pulses with the frame synchronising pulses in said frame synchronising separator with the same sign as and occurring within the frame synchronising pulses.

3. Receiver for combined sound and television waveforms in which the sound intelligence is transmitted over the same channel as the picture intelligence and the synchronising signals as a series of modulated pulses of opposite sign to the synchronising pulses during the line blanking periods of the television waveform, comprising means for separating the modulated sound pulses from the received waveform, a sound reproducer, means for demodulating the separated sound pulses, means for feeding the output from said demodulating means to the sound reproducer, and means for demodulating and reproducing the picture intelligence including a frame time base, a channel in the receiver through which the frame synchronising signals are fed to the frame time base, means for generating a series of auxiliary pulses at the line repetition frequency and with a duration longer than that of the sound pulses, and means for applying said auxiliary pulses to the frame synchronising channel with the auxiliary pulses occurring in the framing periods at the same instants as the sound pulses but in opposite phase thereto, whereby the disturbing effect of the sound pulses upon frame synchronisation is counteracted.

4. Receiver as claimed in claim 3, wherein the auxiliary pulses are applied to the frame synchronising separator of the receiver.

DENNIS I. LAWSON.
ARTHUR V. LORD.

(References on following page)

REFERENCES CITED

The following references are of record in the file of this patent:

UNITED STATES PATENTS

| Number | Name | Date |
|---|---|---|
| Re. 22,390 | Lewis | Nov. 9, 1943 |
| 2,212,933 | Fandell | Aug. 27, 1940 |
| 2,215,175 | Fewing | Sept. 17, 1940 |
| 2,258,732 | Blumlein | Oct. 14, 1941 |
| 2,295,023 | Beatly | Sept. 8, 1942 |
| 2,391,776 | Frendendall | Dec. 25, 1945 |
| 2,416,424 | Wilson | Feb. 25, 1947 |

FOREIGN PATENTS

| Number | Country | Date |
|---|---|---|
| 503,529 | Great Britain | Apr. 11, 1939 |

OTHER REFERENCES

British Journal (IRE), July 1946, pages 251 to 274.